US011448138B2

United States Patent
Romero et al.

(10) Patent No.: US 11,448,138 B2
(45) Date of Patent: Sep. 20, 2022

(54) SURGE RECOVERY SYSTEMS AND METHODS

(71) Applicant: RAYTHEON TECHNOLOGIES CORPORATION, Farmington, CT (US)

(72) Inventors: Michael M. Romero, Manchester, CT (US); Gary Collopy, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 176 days.

(21) Appl. No.: 16/783,731

(22) Filed: Feb. 6, 2020

(65) Prior Publication Data
US 2021/0246837 A1    Aug. 12, 2021

(51) Int. Cl.
*F02C 9/16*     (2006.01)
*F02C 7/32*     (2006.01)

(52) U.S. Cl.
CPC ............... *F02C 9/16* (2013.01); *F02C 7/32* (2013.01); *F05D 2270/101* (2013.01); *F05D 2270/62* (2013.01)

(58) Field of Classification Search
CPC .... F02C 7/275; F02C 7/32; F02C 9/16; F05D 2270/101; F05D 2220/76; F01D 15/10; F01D 21/14
See application file for complete search history.

(56) References Cited

U.S. PATENT DOCUMENTS

| 2006/0225431 | A1* | 10/2006 | Kupratis | ................ F01D 15/10 60/39.24 |
| 2015/0369138 | A1 | 12/2015 | Phillips et al. | |
| 2016/0061053 | A1 | 3/2016 | Thomassin | |
| 2017/0002820 | A1* | 1/2017 | Benim | ................ F04D 27/001 |
| 2017/0159577 | A1* | 6/2017 | Hino | ......................... H02J 3/46 |
| 2017/0226934 | A1 | 8/2017 | Robic et al. | |
| 2017/0335710 | A1 | 11/2017 | Klemen et al. | |
| 2019/0165708 | A1 | 5/2019 | Smith et al. | |
| 2019/0368500 | A1* | 12/2019 | Epstein | ................... F04D 25/06 |
| 2019/0382121 | A1* | 12/2019 | Schwarz | ............... B64D 31/14 |

OTHER PUBLICATIONS

European Patent Office, European Search Report dated Jun. 16, 2021 in Application No. 21155480.3.

* cited by examiner

*Primary Examiner* — Andrew H Nguyen
(74) *Attorney, Agent, or Firm* — Snell & Wilmer L.L.P.

(57) ABSTRACT

A surge control system includes a rotor system with at least one compressor section and at least one turbine section operably coupled to a shaft. The surge control system also includes sensors configured to collect sensor data from the rotor system, an electric motor operably coupled to the rotor system, and a controller. The controller is operable to detect surge event from the sensor data, determine an amount of power to apply to the rotor system, and increase the amount of power provided to the rotor system to recover from the surge event.

5 Claims, 7 Drawing Sheets

SURGE RECOVERY SYSTEMS AND METHODS

FIELD

This disclosure relates generally to gas turbine engines, and more particularly for systems and methods for controlling surge of gas turbine engines.

BACKGROUND

The subject matter disclosed herein generally relates to rotating machinery and, more particularly, to a method and an apparatus for surge recovery.

Surge is an oscillatory fluid mechanic instability of a compression system and thus endemic to all compressors. Surge should be avoided since it reduces the thrust of an engine, induces high temperatures, large mechanical stresses and deflections. Compressors are typically designed and installed with a goal of avoiding the so-called "stability boundary", which marks the operational boundary for instability inception. Control laws for gas turbine engines are typically designed to avoid actions that could induce surge, such as overly rapid transients. In addition, variable geometry, such as variable angle stators and surge control valves, may be used to modify gas path flow to reduce the likelihood of surge or to aid in surge recovery. Over the last several decades, so called surge recovery approaches have been proposed and demonstrated in test apparatus, and in some cases in engines. These are distinguished from the older approaches in service in that they use real time data from sensors in the engine to command one or more high speed actuators. Actuation techniques proposed or demonstrated include fuel flow modulation, variable vanes, jets into the compressor, and bleed from the compressor.

A surge cycle may include exceeding a stability limit, stalling blades in the compressor, releasing a pressure wave, and cycling down to a lower pressure ratio. The process may be repeated in successive compressor surges. A large number of surge cycles at high burner pressures increase the risk of degrading compressor health and performance. The certification of a gas turbine engine for use in an aircraft requires that the engine demonstrate sufficient recovery from surge. Sufficient recovery may be specified as a minimum thrust requirement without over-temperature or damage that precludes operation.

SUMMARY

A surge recovery control system is disclosed herein. The surge control system may comprise: a first rotor system comprising a first compressor and a first turbine operably coupled to a first shaft; a controller configured to collect or synthesize data from a sensor of the first rotor system; a first electric motor operably coupled to the first rotor system; and a controller electrically coupled to the sensor and the first electric motor, the controller operable to: detect a surge of the first compressor; determine a first amount of power to provide to the first shaft via the first electric motor; command the first electric motor to increase power to the first shaft; and increase a stability margin of the first compressor in response to increasing the power.

In various embodiments, increasing the power comprises applying a surge recovery control power to increase the stability margin of the first compressor. The surge recovery control system may further comprise a second rotor system and a second motor operably coupled to the second rotor system, the second rotor system comprising a second compressor and a second turbine operably coupled to a second shaft, wherein the second shaft is parallel with the first shaft. Operations of the controller may further comprise determining a second amount of power to extract from the second shaft. Increasing the power to the first shaft may correspond to extracting the power from the second shaft. The first electric motor may be aligned in parallel with the first shaft. The first electric motor may be coupled to the first shaft through a geared interface.

A gas turbine engine is disclosed herein. The gas turbine engine may comprise: a first compressor section; a first turbine section; a combustor section between the first compressor section and the first turbine section; a first shaft operably coupling the first compressor section and the first turbine section, wherein the first compressor section, the first turbine section, and the first shaft form a rotor system; a sensor or sensors configured to collect sensor data (sensed or synthesized) from the first rotor system; a first electric motor operably coupled to the rotor system, the first electric motor configured to provide a power assist to the first shaft in response to a surge in the first compressor section, wherein the power assist increases a stability margin of the first compressor section.

In various embodiments, the gas turbine engine may further comprise a second electric motor, a second compressor section, a second turbine section, and a second shaft operably coupled to the second compressor section and the second turbine section, wherein the second shaft is parallel with the first shaft, the second electric motor operably coupled to the second shaft. The second electric motor may be configured to extract power from the second shaft in response to the surge in the first compressor section. Extracting the power from the second shaft may be used to provide the power assist to the first shaft. The first shaft may be a high speed spool. The second shaft may be a low speed spool. The high speed spool may operate at higher speeds than the low speed spool. The first electric motor may be operable to apply power to the rotor system to recover from the surge of the first compressor section. The first electric motor may be aligned in parallel with the first shaft. The first electric motor may be parallel with the first shaft.

A method of recovering from a surge event is disclosed herein. The method may comprise: detecting the surge event for a compressor of a gas turbine engine; determining an amount of power to apply to a first spool of the gas turbine engine; and increasing a power provided to the first spool by the amount of power determined.

In various embodiments the method may further comprise increasing a stability margin of the compressor. The stability margin is defined as the operation margin of the compressor to the stability limit. The method may further comprise extracting power from a second spool to transfer to the first spool.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Figure 1:
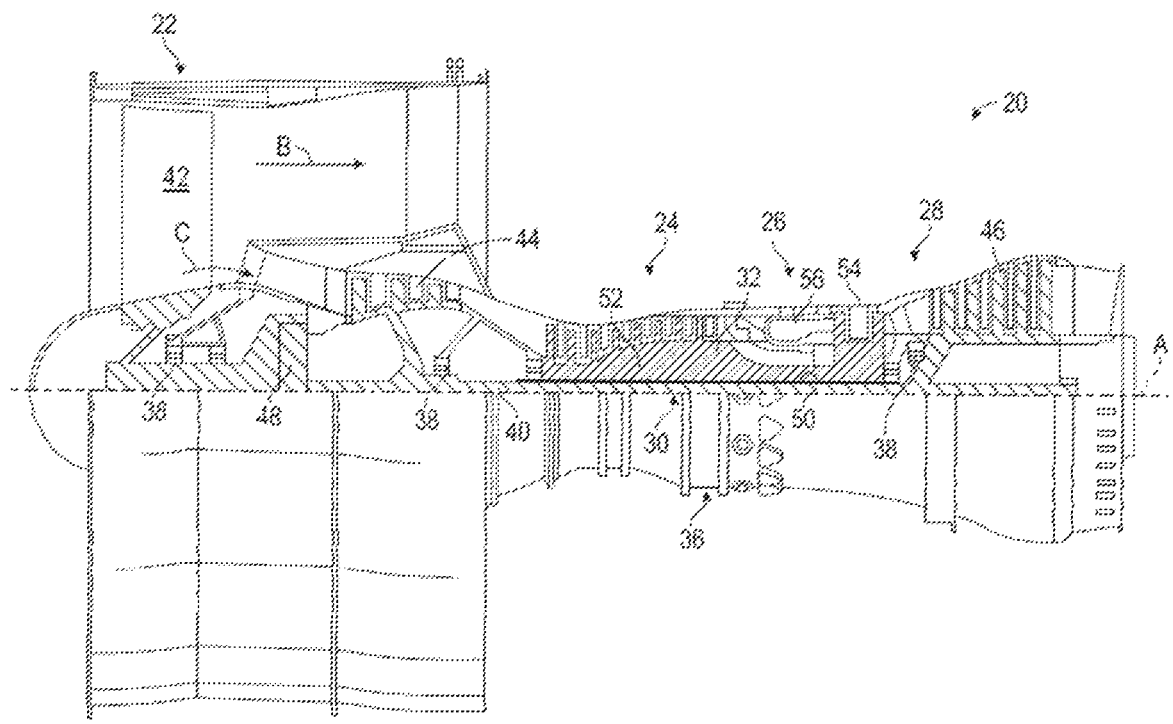
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$_{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
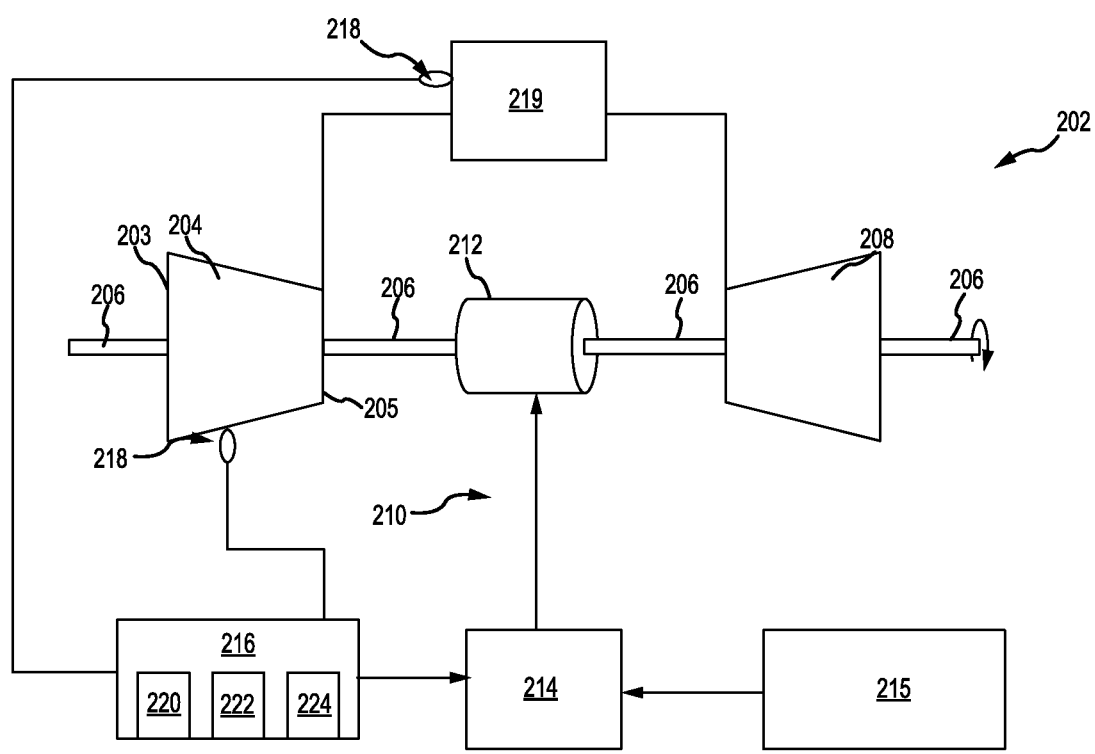
FIG. 2 is a schematic diagram of a rotor system with a surge control system, in accordance with an embodiment of the disclosure.

Referring now to the drawings, FIG. 2 illustrates a rotor system 202 that includes at least one compressor section 204 and at least one turbine section 208 operably coupled to a shaft 206. The rotor system 202 can be a spool of the gas turbine engine 20 of FIG. 1. For example, rotor system 202 may comprise the high speed spool 32. The at least one compressor section 204 can be similar to the high pressure compressor 52, the shaft 206 can be similar to the outer shaft 50, and the at least one turbine section 208 can be similar to the high pressure turbine 54 of FIG. 1.

Figure 7:
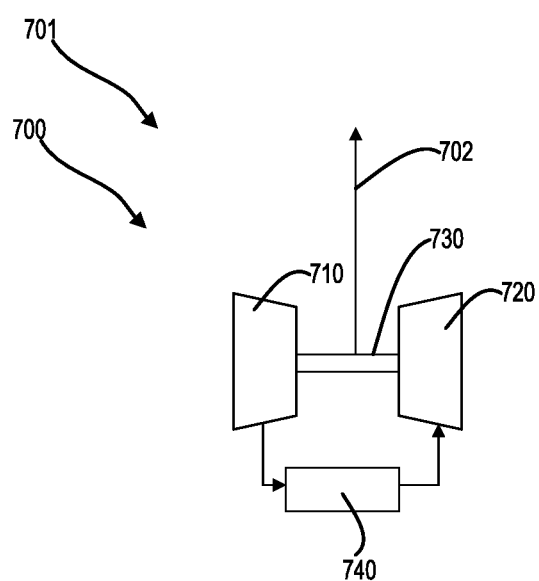
FIG. 7 illustrates an auxiliary power unit, in accordance with various embodiments.

In the example of FIG. 2, a surge control system 210 is operably coupled to the rotor system 202. The surge control system 210 includes an electric motor 212 directly coupled to the shaft 206. The electric motor 212 may be disposed between the compressor section 204 and the turbine section 208. The surge control system 210 also includes drive electronics 214 operable to control current to the electric motor 212 to adjust the speed and/or torque of the electric motor 212. In various embodiments the drive electronics may include, or be coupled to, a power source, such as a battery, an auxiliary power unit, a super capacitor or the like. For example, referring to FIG. 7, power source 700 may comprise an auxiliary power unit 701. The power source 700 may be in drive electronics 214, or coupled to drive electronics 214. The power source 700 may be configured to power the electric motor 212 during operation of the rotor system 202. The auxiliary power unit 700 comprises a compressor 710, a turbine 720, a shaft 730 coupling the compressor 710 to the turbine 720, a combustor 740 disposed between the compressor 710 and the turbine 720. The auxiliary power unit 700 may be configured to provide power to electric motor 212 via power output 702.

Referring back to FIG. 2, the electric motor 212 can be a direct current (DC) motor or an alternating current (AC) motor including conventional motor components, such as a motor rotor and motor stator, including a plurality of motor windings and/or permanent magnets. The drive electronics 214 can also include conventional motor current control electronics, such as filters, switching components, rectifiers, inverters, and the like. In some embodiments, the electric motor 212 is a motor-generator operable in a generator mode to increase a load on the rotor system 202 and in a motoring mode to decrease the load of the rotor system 202. When implemented as a motor-generator, the drive electronics 214 may include power regulating circuitry and/or power converters to regulate electric power produced by the electric motor 212 in generator mode. For example, the electric motor 212 can act as a variable frequency generator in generator mode due to speed fluctuations of rotation of the shaft 206, which may be primarily driven by the at least one turbine section 208. In various embodiments, the electric motor 212 may be operable as a starter motor to partially or completely power rotation of the shaft 206 in a starting mode of operation (e.g., to start the gas turbine engine 20 of FIG. 1). Other uses and functions for the electric motor 212 are contemplated. The drive electronics 214 and the electric motor 212 may be coupled to, and in electrical communication with, a power source 215. The power source 215 may comprise a battery, an auxiliary power unit (APU), or the like.

A controller 216 of the surge control system 210 can monitor one or more rotor system sensors 218 while the rotor system 202 is rotating. The sensors 218 can be any type or combination of sensors operable to measure or synthesize a number of parameters of the rotor system 202 and the airflow through it. For example, the rotor system sensors 218 can include one or more pressure sensors, temperature sensors, speed sensors, torque sensors, and the like. The rotor system sensors 218 may be located proximate to the at least one compressor section 204, for example to measure pressure, temperature, or thrust within or in the vicinity of the at least one compressor section 204. The controller 216 can control a speed and torque of the electric motor 212 through the drive electronics 214. The controller 216 may also control other system aspects, such as controlling operation of the gas turbine engine 20 of FIG. 1. In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the drive electronics 214 and/or other systems.

Figure 6:
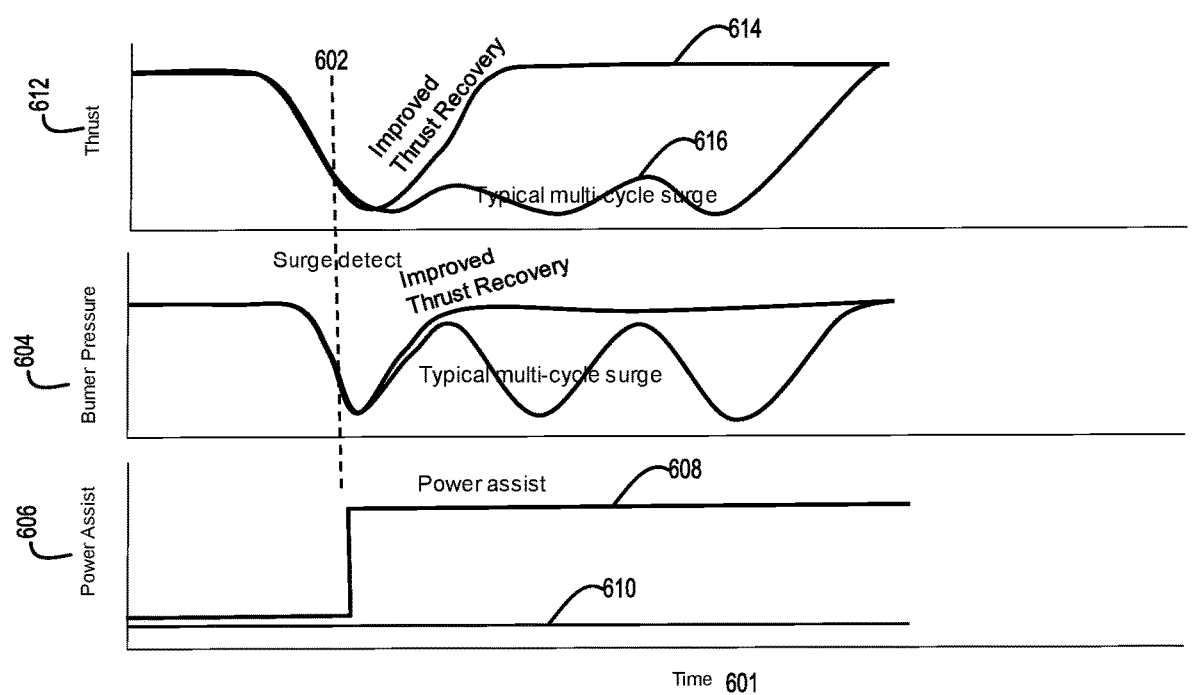
FIG. 6 is various plots of a surge recovery over time, in accordance with various embodiments.

The controller 216 is operable to detect a surge of the rotor system 202 based on the sensor data from the one or more rotor system sensors 218 or from a synthesized parameter. For example, the controller 216 may monitor a rotational speed of the shaft 206, pressure changes within the at least one compressor section 204 with respect to time, and/or temperature changes within the compressor section 204 with respect to time. The controller 216 can also monitor one or more torques on the shaft 206, for example, through direct torque measurements from the one or more rotor system sensors 218 or derived torques based on system models and/or known relationships based on mass, acceleration, and/or geometric configuration of the rotor system 202. The controller 216 is configured to monitor the one or more sensors 218 which may be coupled to the rotor system 202 and/or a combustor 219. During operation, one or more sensors 218 may be configured to determine whether the plurality of sensor data from the one or more sensors 218 is indicative of surge. Once the stability limit is reached for a respective pressure ratio and mass flow rate, oscillating air flow pattern (e.g., pressure waves) may be released forward within the at least one compressor section 204 that can result in development of an oscillating torque on the shaft 206. An appropriate measurement of the thrust, pressure, temperature at the inlet 203 and/or outlet 205 of the compressor section 204, burner pressures, burner temperatures, pressure ratios, and/or temperature ratios may be used to determine when the compressor section 204 is experiencing surge. A model or mapping function (e.g., a multi-variate table) may be used to establish combinations of parameters deemed sufficient under a set of operating conditions to determine whether surge oscillation is detected for a given set of operating conditions (e.g., pressure ratios, mass flow rates, inlet volume flows, speeds, etc.). Surge occurs in cycles. By utilizing systems and methods as disclosed herein, a compressor may recover from a surge faster than typical systems and methods. In this regard, thrust may be improved quicker and/or burner pressure may improve quicker (as illustrated in FIG. 6). The method of surge detection as described in FIG. 2 from controller 216 may be used to determine the moment in time 602 the compressor enters a surge cycle demonstrated by the burner pressure trace 604 as a function of time. At this point in time 602, an amount of surge recovery power is determined by controller 216, and supplied to shaft 206, as demonstrated by the power assist trace 606 as a function of time which compares power assist with surge recovery 608 against a conventional engine 610 supplying no additional power into shaft 206. A comparison of thrust traces as a function of time 612 shows a significant improvement in thrust recovery with respect to time 601 of an engine with surge recovery 614 as compared to a conventional engine multi-surge cycle 616.

The controller 216 can determine a surge control power assist (e.g., torque and/or speed) to increase the amount of stability margin and to move the compressor operating point into an operable region of the rotor system 202 and command the electric motor 212 to apply the surge control power assist to the rotor system 202. The controller 216 may be used to determine surge and for stabilizing the compressor section 204 from the surge. The controller 216 may be configured to detect when surge is occurring and not prior to a surge event. The controller 216 may also be used for determining a surge control power assist to increase the amount of stability margin and to move the compressor operating point to an operable region in the compressor map of compressor 204, in between surge cycles, thereby eliminating or reducing the number of surge cycles a conventional engine may undergo by commanding the electric motor 212 to apply the surge recovery control power assist to the rotor system 202. The surge control recovery power assist can include a torque and/or a speed to increase the amount of stability margin, moving the compressor section into an operable region, resulting in recovery from the surge of the rotor system 202. For instance, the controller 216 can drive the electric motor 212 to apply increased torque, increased speed, or a combination of the two, into the rotor system 202 to stabilize surge of the rotor system 202. Further, the controller 216 may operate the electric motor 212 in a motoring mode to decrease the load and/or apply the surge control power assist of the rotor system 202. By decreasing the load during surge, a stability margin may increase and/or allow the compressor to stabilize and recover. The surge recovery control system 210 improves compressor stability margin allowing the engine to recover to sufficient thrust faster than conventional engines.

Figure 3:
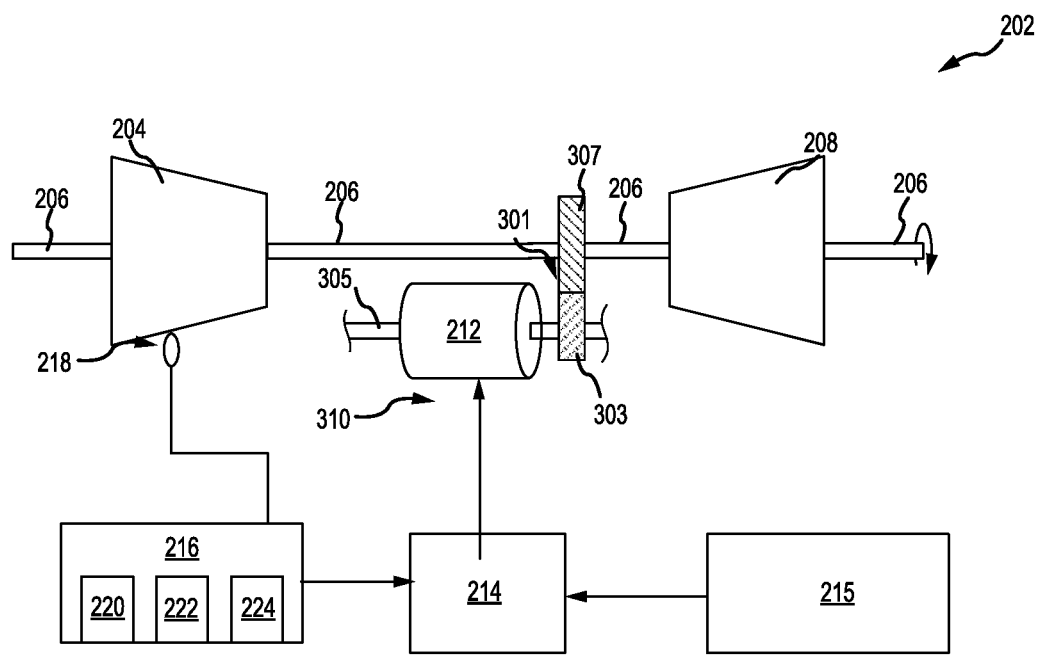
FIG. 3 is a schematic diagram of a rotor system with a surge control system, in accordance with an embodiment of the disclosure.

Referring now to FIG. 3, a schematic diagram of the rotor system 202 with a surge recovery control system 310 is depicted as an alternate embodiment of the surge control system 210 of FIG. 2. In the example of FIG. 3, similar to FIG. 2, the controller 216 is operable to measure aspects of the motion of the rotor system 202 through one or more rotor system sensors 218 and command the drive electronics 214 to modify a speed and/or torque of the electric motor 212 to apply a surge control power to the rotor system 202. Rather than the electric motor 212 being directly coupled to the shaft 206, a surge recovery control system 310 of FIG. 3 includes a geared interface 301 that operably couples the electric motor 212 to the shaft 206. The geared interface 301 can include, for instance, a motor gear 303 coupled to a motor shaft 305. The electric motor 212 may be configured to drive the motor shaft 305. The motor shaft 305 may be aligned in parallel with the shaft 206. The geared interface 301 can also include a rotor gear 307 coupled to the shaft 206 and operably coupled to the motor gear 303. The motor gear 303 and rotor gear 307 can each be spur gears. The motor shaft 305 can be a tower shaft that enables the electric motor 212 to be separated at a greater distance from the rotor system 202 than in the surge control system 210 of FIG. 2. Further separation of the electric motor 212 from the rotor system 202 can improve accessibility to the electric motor 212 for servicing and may reduce heating effects of the rotor system 202 on the electric motor 212 (e.g., due to fuel combustion). Surge control torque computations by the controller 216 can be adjusted to compensate for effects of the geared interface 301, such as gear backlash between the motor gear 303 and the rotor gear 307.

Figure 4:
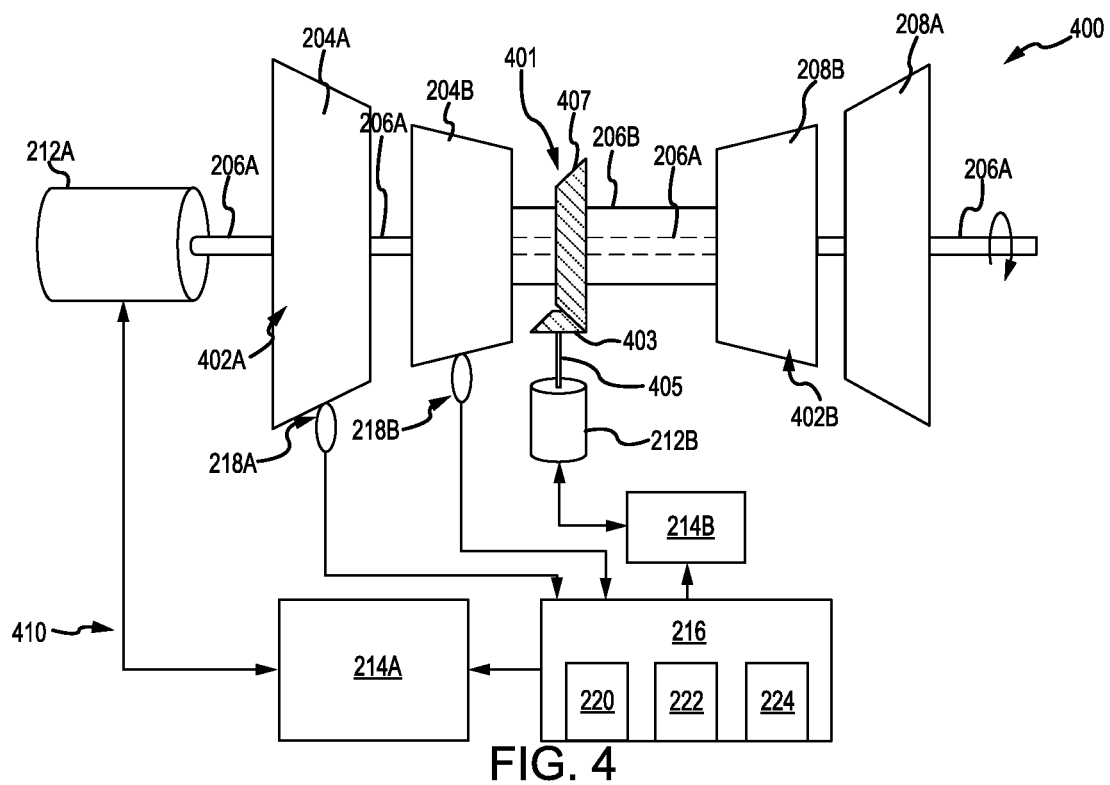
FIG. 4 is a schematic diagram of a dual rotor system configured for surge recovery, in accordance with an embodiment of the disclosure.

FIG. 4 is a schematic diagram of a dual rotor system 400 with surge recovery power control, in accordance with various embodiments. The dual rotor system 400 includes a first rotor system 402A and a second rotor system 402B, which may be an embodiment of the gas turbine engine 20 of FIG. 1. For instance, the first rotor system 402A can be the low speed spool 30 of the gas turbine engine 20, and the second rotor system 402B can be the high speed spool 32 of the gas turbine engine 20. The first rotor system 402A can include a first compressor section 204A and a first turbine section 208A operably coupled to a first shaft 206A. The second rotor system 402B can include a second compressor section 204B and a second turbine section 208B operably coupled to a second shaft 206B, where the second shaft 206B is concentrically arranged with respect to the first shaft 206A. With respect to the gas turbine engine 20 of FIG. 1, the first compressor section 204A can be similar to the low pressure compressor 44, the first shaft 206A can be similar to the inner shaft 40, and the first turbine section 208A can be similar to the low pressure turbine 46 of FIG. 1. Similarly, the second compressor section 204B can be similar to the high pressure compressor 52, the second shaft 206B can be similar to the outer shaft 50, and the second turbine section 208B can be similar to the high pressure turbine 54 of FIG. 1.

A surge control system 410 includes a first electric motor 212A driven by first drive electronics 214A and a second electric motor 212B driven by second drive electronics 214B. A first set of one or more rotor system sensors 218A may be associated with the first rotor system 402A, a combustor system, or the like, and a second set of one or more sensors 218B may be associated with the second rotor system 402B, a combustor system, or the like. A single instance of the controller 216 can be configured to independently control the first electric motor 212A responsive to sensor data from the one or more rotor system sensors 218A or 218B, and separately control the second electric motor 212B responsive to sensor data from the one or more sensors 218A or 218B. Sensors 218B may be rotor system sensors, combustor sensors (e.g., burner sensors), or the like. In other embodiments, the controller 216 is further subdivided as two or more separate controls, for instance, where a separate instance of the controller 216 is provided for each of the first rotor system 402A and the second rotor system 402B. The first electric motor 212A and the second electric motor 212B can be independently controlled to each supply a supplemental motive force to the respective shafts 206A, 206B, where fuel combustion in the combustor section 26 (FIG. 1) can provide a primary motive force for the first rotor system 402A as the low speed spool 30 and for the second rotor system 402B as the high speed spool 32.

In various embodiments, the first electric motor 212A is operably coupled to the first shaft 206A directly, while the second electric motor 212B is operably coupled to the second shaft 206B using a geared interface 401. The geared interface 401 can include, for instance, a motor gear 403 coupled to a motor shaft 405 driven by the second electric motor 212B and a rotor gear 407 coupled to the second shaft 206B. The motor gear 403 and the rotor gear 407 may each be beveled gears. While the example of FIG. 4 depicts the surge control system 410 with the first and second electric motor 212A, 212B in different configurations, it will be understood that both of the first and second electric motors 212A, 212B can be directly or indirectly coupled to corresponding first and second shafts 206A, 206B. Further, the first electric motor 212A may be indirectly coupled through a tower shaft to the first shaft 206A and the second electric motor 212B may be directly coupled to the second shaft 206B. Further, the coupling locations of the first and second electric motors 212A, 212B to the first and second shafts 206A, 206B can vary, and the coupling locations depicted in FIG. 4 are merely one example.

In various embodiments, during a surge, the first electric motor 212A may be configured to act as a generator by extracting power from the first shaft 206A. In this regard, the stability margin of compressor 204B may increase and/or move the compressor operating point into an operable region of the rotor system 202. In various embodiments, power generated from the first electric motor 212A may be configured to drive the second electric motor 212B and command the drive electronics 214B to increase a speed and/or torque of the electric motor 212 to apply a surge control power to the second shaft 206B of dual rotor system 400.

Figure 5:
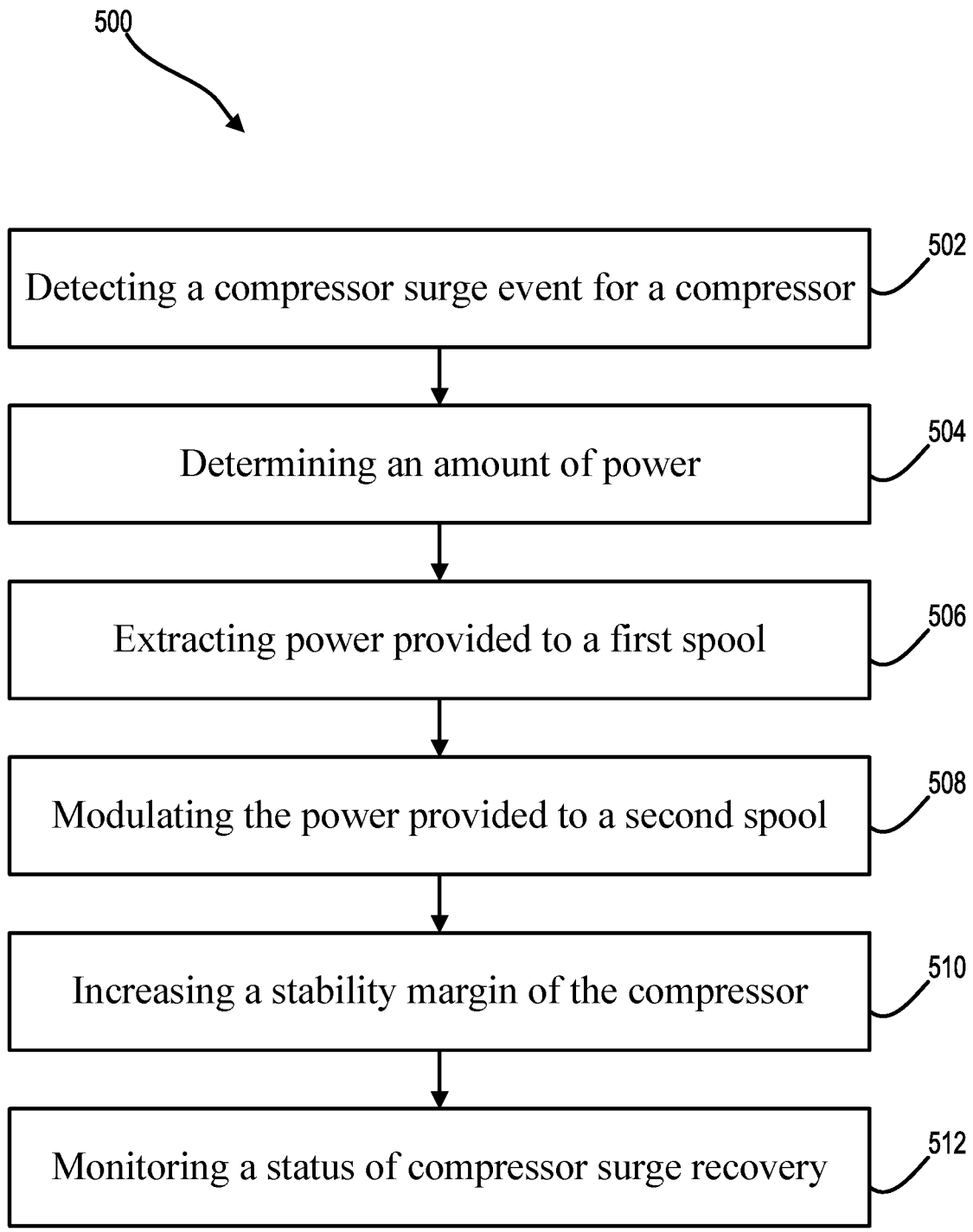
FIG. 5 is a flow chart illustrating a method, in accordance with an embodiment of the disclosure.

Referring now to FIG. 5 with continued reference to FIGS. 1-4, FIG. 5 is a flow chart illustrating a method 500 of recovering from a surge event by using a surge control system 410, in accordance with an embodiment. The method 500 may be performed, for example, by the surge control systems 210, 310, 410 of FIGS. 2-4. For purposes of explanation, the method 500 is described primarily with respect to the surge recovery control system 410 of FIG. 4; however, it will be understood that the method 500 can be performed on other configurations, such as the surge control systems 210, 310 of FIGS. 2 and 3, as well as other configurations.

The method 500 may comprise detecting a surge event from a compressor (step 502). The surge event may be detected in the control from a sensor. The detection of the surge event may be obtained from one or more pressure sensors, temperature sensors, speed sensors, torque sensors, synthesized parameters and the like. The method 500 may further comprise determining an amount of power to extract from a first spool and/or provide to a second spool (step 504). The amount of power may be determined based on, and in proportion to a measurement form the sensed or synthesized engine parameters. The method 500 may further comprise extracting power from a first spool (step 506). The first spool may be a high speed spool (e.g., high speed spool 32, or the like). The method 500 may further comprise increasing power provided to a second spool (step 508). The second spool may be a low speed spool (e.g., low speed spool 30). The method 500 may further comprise increasing a stability margin of the compressor (step 510). Extracting power from the first spool may increase the stability margin of the compressor on its own without step 508. Similarly, step 508 may be performed without step 506 (e.g., power may be increased at the second spool without extracting power form the first spool). Extracting power from the first spool may also decrease a thrust of the gas turbine engine. The amount of power extracted may be balanced with the decrease in thrust to facilitate recovery from surge, while maintaining sufficient thrust. The method 500 may further comprise monitoring a status of surge recovery (step 512). The method 500 may be repeated if the compressor does not recover from the surge after and/or if the compressor experiences another cycle of surge.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A surge control system comprising:
a power source;
a first rotor system comprising a first compressor and a first turbine operably coupled to a first shaft;
a sensor disposed proximate the first rotor system;
a first electric motor operably coupled to the first rotor system;
a second rotor system and a second motor operably coupled to the second rotor system, the second rotor system comprising a second compressor and a second turbine operably coupled to a second shaft; and
a controller electrically coupled to the sensor and the first electric motor, the controller operable to:
detect or synthesize one or more parameters to determine when a surge occurs in the first compressor;
determine a first amount of power to provide from the power source to the first shaft via the first electric motor;
command the first electric motor to increase power to the first shaft;
monitor a first magnitude of the power applied to the first shaft commensurate with a severity of the surge; and
adjust the first magnitude of the power applied to the first shaft commensurate with the severity of the surge; and
increase a stability margin of the first compressor in response to increasing the power;
determine a second amount of power to extract from the second shaft;
command a second electric motor to extract the power from the second shaft;
monitor a second magnitude of the power extracted from the second shaft commensurate with the severity of the surge and loss in thrust due to power extraction; and
adjust the second magnitude of the power extracted from the second shaft commensurate with the severity of the surge and loss in thrust due to power extraction; and
increase the stability margin of the first compressor in response to extracting power from the second shaft.

2. The surge control system of claim 1, wherein increasing the power comprises applying a surge recovery control power to increase the stability margin of the first compressor.

3. The surge control system of claim 1, wherein the second shaft is parallel with the first shaft.

4. The surge control system of claim 1, wherein increasing the power to the first shaft corresponds to extracting the power from the second shaft.

5. The surge control system of claim 1, wherein the first electric motor is coupled to the first shaft through a geared interface.

* * * * *